March 28, 1950  E. B. WAGNER  2,502,356
REVERSING ATTACHMENT FOR VEHICLES
Filed Dec. 26, 1947  2 Sheets-Sheet 1
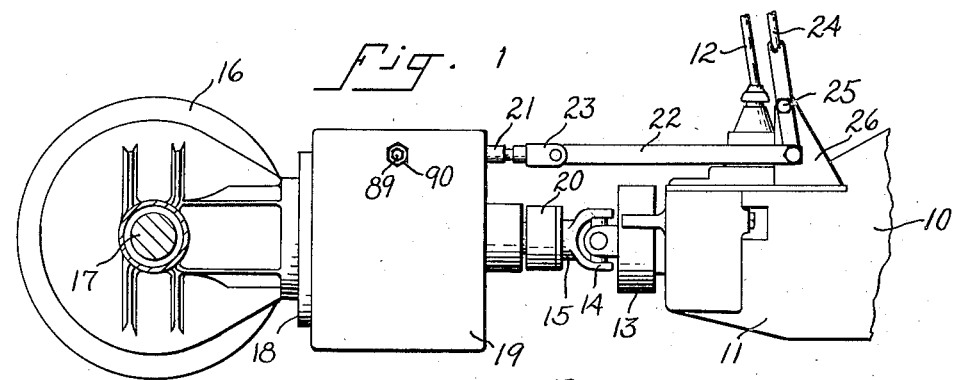
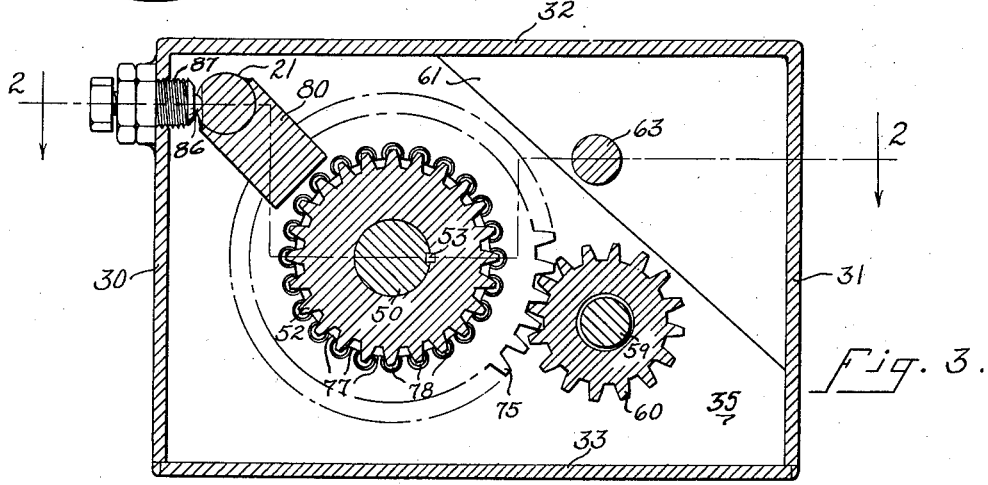
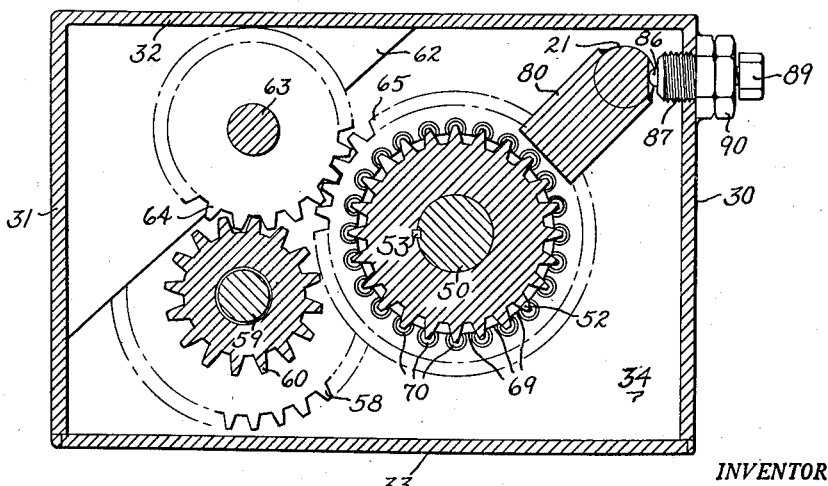
INVENTOR.
Eddie B. Wagner
BY
Attorney March 28, 1950 — E. B. WAGNER — 2,502,356
REVERSING ATTACHMENT FOR VEHICLES
Filed Dec. 26, 1947 — 2 Sheets-Sheet 2
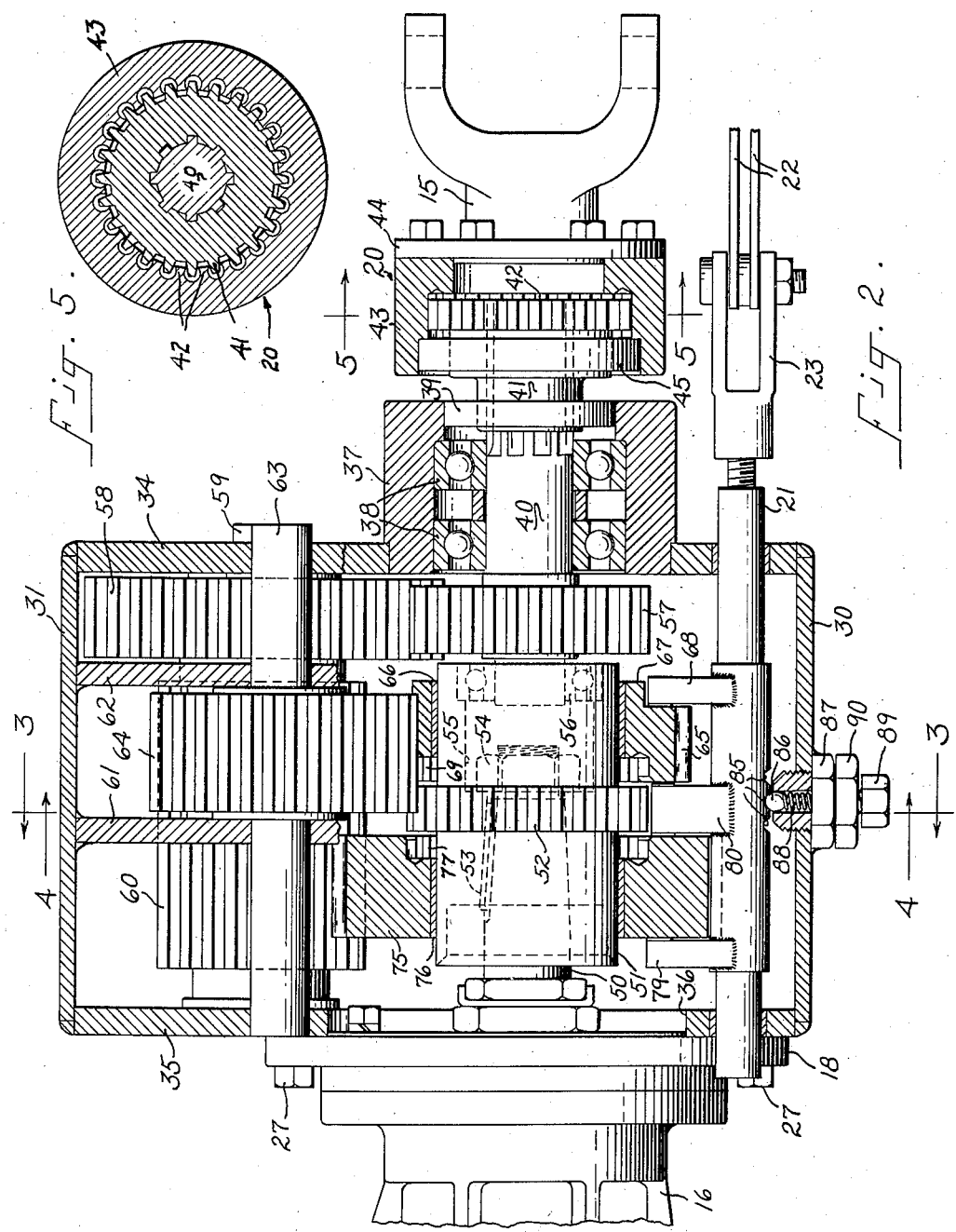
INVENTOR.
Eddie B. Wagner
BY
Attorney Patented Mar. 28, 1950

2,502,356

UNITED STATES PATENT OFFICE 2,502,356

REVERSING ATTACHMENT FOR VEHICLES

Eddie B. Wagner, Portland, Oreg.

Application December 26, 1947, Serial No. 794,065

2 Claims. (Cl. 74—377)

The present invention relates to automotive vehicles, the invention comprising a reversing attachment to be inserted between the engine and driven wheels of an automotive vehicle.

The principal object of the present invention is to provide means for reversing the direction of movement of a vehicle without reversing the direction of rotation of the propeller shaft connected to an automotive engine through the usual transmission mechanism including a gear shift device.

The invention is of particular utility in industrial equipment such as scoops, lift fork trucks, hay forks and other similar equipment designed for transporting various materials. The ordinary vehicle driven by a conventional automotive engine comprises an engine having associated therewith a transmission device including sets of gears of different ratios whereby the vehicle may be driven at various speeds with inversely proportionate power factors between the engine and the driven wheels. Such a transmission usually comprises three or four speeds forward and one speed in reverse, the reverse speed being relatively slow. In many industrial applications of automotive vehicles it is necesary, or at least highly desirable, that the vehicle travel in reverse for considerable distances, which procedure is very slow with the ordinary vehicle. The object of my invention is to apply the normal forward transmission gear sets to producing movement of the vehicle in reverse as well as in the forward direction when desired, without in any way affecting the normal transmission or gear shift mechanism.

A further object of the present invention is to provide a simplified, rugged and durable reversing attachment which may be substituted for the usual propeller shaft of an automotive vehicle.

The objects and advantages of the present invention will be more readily apparent from inspection of the following specification taken in connection with the accompanying drawings wherein like numerals refer to like parts throughout, while the features of novelty will be more distinctly pointed out in the appended claims.

In the drawings

Fig. 1 is an elevation of a portion of an automotive vehicle including the differential and the transmission housing portion of an automotive engine, the combination having the reversing attachment of the present invention applied thereto;

Fig. 2 is a horizontal section through the reversing attachment taken substantially along the line 2—2 of Fig. 3;

Fig. 3 is a vertical section taken substantially along the line 3—3 of Fig. 2 and looking in the direction of the arrows;

Figure 4 is a vertical section taken substantially along line 4—4 of Fig. 2 and looking in the direction of the arrows; and Fig. 5 is a vertical section taken substantially along line 5—5 of Fig. 2.

In the present disclosure there is indicated an automotive engine 10 having a transmission housing 11 integral therewith and from which upwardly projects a gear shift lever 12 by means of which the direction of rotation of a flywheel 13 may be controlled, as well as the speed of rotation thereof in the forward direction as is customary in such devices. The flywheel 13 supports one fork of a universal joint 14 including a portion of a propeller shaft 15. Normally the propeller shaft 15 would extend rearwardly into driving engagement with the gears housed in a differential 16 from which transverse shafts such as shaft 17 extend to each of a pair of driving wheels. In the present invention the differential housing is shown as provided with a connecting flange 18 to which would normally be attached the propeller shaft housing extending longitudinally of the vehicle, and the invention herein disclosed and claimed comprises a reversing attachment including a housing 19 connected to the flange 18 and a coupler housing 20 to which a stub section of the propeller shaft 15 is attached. The illustration is of a portion of a close-coupled vehicle and it is to be appreciated that the length of the propeller shaft section 15 may be varied to suit the particular vehicle.

A jackshaft 21 projects forwardly from the housing 19 and is adjustably connected to a pair of links 22 through a clevis 23 threaded onto the end of the shaft. The links 22 are connected to the lower end of an attachment reversing lever 24 pivoted at 25 to a bracket 26 fixed to the top of the transmission housing. The flange 18 is provided with bolt receiving lugs through which bolts 27 normally pass into the rear end of the propeller shaft housing, and the same bolts in the present instance are threaded into holes drilled in the wall of the reversing attachment housing. The coupler 20 comprises a splined connection which may be slidingly associated with the reversing attachment as will presently appear. The reversing attachment lever and its mounting bracket may be readily mounted upon any standard engine.

The reversing attacment comprises a box which may be easily formed by bending a sheet of steel plate to form side walls 30 and 31 and a top 32, to which may be welded a bottom plate 33, a front wall 34 and a rear wall 35, the front and rear walls being made of heavier plate materials. The rear wall 35 is provided with a large opening 36 to the edge of which is fastened the flange 18 of the differential housing. The front wall 34 is provided with an aligned opening into which is welded an outboard bearing support 37 supporting a pair of bearings 38 and an oil seal 39. A splined driving shaft 40 is supported in the bearings 38 and projects forwardly into the coupling 20, the splines thereof meshing with internal splines in the hub of a coupler 41, the teeth of which match longer internal teeth 42 in a cylindrical block 43 forming the main portion of the coupling. A plate 44 is bolted to the end of the block 43 and is welded or otherwise affixed to the end of the stub shaft 15 which supports the complementary fork of the universal joint 14. An oil seal 45 preferably surrounds the hub of the coupler 41 and is force-fitted into a seat on the rear end of the block 43. The teeth provide positive means to transmit rotation from the propeller shaft section 15 to the driving shaft 40 of the gear attachment, the splines between coupler 41 and the driving shaft and the teeth on parts 41 and 43 providing extensible means for transmitting force to the differential as well as some universal joint action.

The driving shaft 40 is aligned with the usual universal stub shaft 50 projecting forwardly from the differential housing and which would normally be connected to a universal joint at the rear end of the propeller shaft. In this construction the shaft section 50 extends into the elongated hub 51 of a main driven clutch element 52 and is fastened therein by a key 53 and a nut 54 in a hollow socket 55 in the outer end of the hub. The free end of the socket 55 journals a bearing 56 which supports the inner end of the shaft 40. A main driving gear 57 is fixed to shaft 40, the gear 57 being substantially equal in diameter to element 52.

Gear 57 meshes with a large gear 58 fixed to a shaft 59 extending through the front and rear walls. The rear surface of gear 58 has a long gear 60 attached thereto. A pair of brackets 61 and 62 are welded into the upper corner of the housing and provide intermediate supports for a shaft 63 extending through the housing walls, upon which is mounted a gear 64 between the brackets 61 and 62, the gear being in such position as to be engageable at all times with a reversing gear 65 slidably and loosely mounted on the forward end of the hub 51 of element 52, there being a sleeve bearing 66 interposed between the gear 65 and the hub 51. The forward end of the gear 65 is provided with a hub extension 67 in which fits a lug 68 on the jackshaft 21. The rear surface of the gear 65 is provided with internal teeth 69 capable of engaging with the teeth of element 52. The teeth 69 are preferably formed by drilling a circle of countersunk holes 70 in the end of the gear which are then connected by milling a central cavity in the end of the gear. Gears 64 and 65 constitute a reversing gear pair.

The rear end of gear 60 meshes with a large forward gear 75 mounted upon the rear end of hub 51, there being a sleeve bearing 76 interposed between the two whereby the gear 75 is slidably and loosely mounted upon the hub. The forward surface of the gear 75 is provided with internal teeth 77 preferably formed by drilling a circle of countersunk holes 78 and connecting the holes by a central cavity. A lug 79 welded to the jackshaft 21 contacts the rear surface of the gear 75 and an intermediate lug 80 welded to the jackshaft 21 projects between the gears 75 and 65 to act as a spacer therebetween. The lug 80 is slightly wider than the element 52 so that when the jackshaft 21 is in neutral position both of the gears 65 and 75 are maintained out of engagement with element 52 and the stub shaft 50 will remain stationary even though the propeller shaft section 15 is rotating.

The jackshaft 21 is provided with a set of three notches 85 in position to receive a ball 86 mounted in a support 87 extending through the wall 30. The support 87 preferably comprises a drilled, threaded plug or the like which is screwed into position and then welded in its desired relationship. The plug is provided with a central bore in which is compressed a spring 88 for thrusting the ball outwardly against the peaned-over lip of the bore. The outer end of the bore retains a threaded compression adjusting bolt 89 which may be retained in adjusted position by a lock nut 90. The compression of spring 88 is adjusted to hold the jackshaft in one of the three positions determined by the notches 85.

*Operation*

When the jackshaft 21 is in neutral position as seen in Fig. 2 the transmission lever 12 may be shifted to any desired position without driving the axles 17. When the transmission gear shift lever 12 is in neutral position the propeller shaft is not rotating. When the propeller shaft 15 is not rotating, or at least when it is rotating at slow speeds, the jackshaft 21 may be shifted in either direction from neutral by the shifting lever 24. When the lever 24 is thrown forwardly the ball 86 will ride into the forward notch 85 and the lugs on the jackshaft will slide gears 65 and 75 rearwardly until element 52 engages with teeth 69 on gear 65. With the gears in this relationship there are three reversals of direction of rotation with the net result that the differential stub shaft 50 will rotate in the direction opposite to the direction of rotation of the propeller shaft section 15. When the lever 24 is pulled rearwardly ball 86 arrests the jackshaft when it reaches the rearmost notch 85, in which position the lugs on the jackshaft have shifted both gears 65 and 75 forwardly until element 52 meshes with the teeth 77 on gear 75. When the gears are in this relationship there are two reversals of rotation with the net result that the differential stub shaft 50 is driven in the same direction as the propeller shaft 15. Accordingly, if the propeller shaft is rotating in such direction as to drive the vehicle forwardly and the jackshaft 21 is pulled forwardly the vehicle will move forwardly, and if the propeller shaft 15 is rotating in the direction to drive the vehicle rearwardly the vehicle will move rearwardly. Contrariwise, if the propeller shaft 15 is rotating in a direction to drive the vehicle forwardly and the jackshaft 21 is moved rearwardly the vehicle will move rearwardly, while if the jackshaft is moved forwardly the vehicle will move rearwardly. Accordingly, the vehicle may be driven either forwardly or rearwardly through the reverse transmission gear sets at low speed under high power transmission factors, or it may be moved either rearwardly or forwardly through the various sets of gears in a three or four speed forward driving transmission.

It will be readily understood from the foregoing that a considerable saving in time may be accomplished since under no circumstances is the driver compelled to turn a vehicle around in order to achieve the speed or power desired for a particular operation, and the vehicle at all times is capable of the same speeds of movement in either direction.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. An auxiliary transmission for automotive vehicles adapted to be interposed between the propeller shaft and the differential stub shaft of the vehicle, consisting of a housing, a driving gear mounted in said housing and adapted to be connected to the propeller shaft, a long gear driven by said driving gear, a reversing gear pair driven by said long gear and including a first gear constantly in mesh with said long gear and a second gear constantly in mesh with said first gear, a forward gear constantly in mesh with said long gear, means supporting said second gear and said forward gear comprising a driven clutch element upon which said second gear and said forward gear are coaxially mounted and loosely rotatable, said driven clutch element being adapted to be connected to the differential stub shaft, first clutch means formed on said second gear, second clutch means formed on said forward gear, said clutch means being formed to engage said driven clutch element, and means to shift said second gear and said forward gear simultaneously in either direction so as to engage one or the other of said clutch means with said driven clutch element, said first and second clutch means being so spaced that when said second gear and said forward gear are in an intermediate position the driven clutch element is free from both of said clutch means.

2. The construction set forth in claim 1 wherein said driven clutch element comprises a toothed, intermediate section and a cylindrical hub projecting from each side of said section and on which said second gear and said forward gear are mounted, and said clutch means comprise internal teeth on said second gear and on said forward gear adapted to engage said toothed section.

EDDIE B. WAGNER.

REFERENCES CITED

The following references are of record in the file of this patent:

UNITED STATES PATENTS

| Number | Name | Date |
|---|---|---|
| 2,245,815 | Peterson et al. | June 17, 1941 |
| 2,320,757 | Sinclair | June 1, 1943 |
| 2,438,539 | Cook | Mar. 30, 1948 |

FOREIGN PATENTS

| Number | Country | Date |
|---|---|---|
| 367,948 | Italy | Feb. 6, 1939 |